L. A. J. HAWKINS.
HOLDER FOR DENTAL X-RAY FILMS.
APPLICATION FILED MAY 10, 1921.

1,434,894. Patented Nov. 7, 1922.

WITNESSES
H. J. Walker

INVENTOR
L. A. J. HAWKINS
BY
ATTORNEYS

Patented Nov. 7, 1922.

1,434,894

UNITED STATES PATENT OFFICE.

LEE ANDREW J. HAWKINS, OF JEROME, ARIZONA.

HOLDER FOR DENTAL X-RAY FILMS.

Application filed May 10, 1921. Serial No. 468,444.

*To all whom it may concern:*

Be it known that I, LEE A. J. HAWKINS, a citizen of the United States, and a resident of Jerome, in the county of Yavapai and State of Arizona, have invented a new and Improved Holder for Dental X-Ray Films, of which the following is a description.

My invention relates to a device for positioning and holding dental X-ray films for the taking of photographs of given teeth in a set.

The general object of the invention is to provide a device of the indicated character and means to secure it on a tooth to have support thereon to thereby properly position the film for the taking of the X-ray picture.

The invention has for its further object to provide a device of the indicated character as well as various film holding means adapted thereto, so that a holder of a given type may be positioned on the device according to the particular teeth to be subjected to the X-rays.

Reference is to be had to the accompanying drawings forming a part of this specification, it being understood that the drawings are merely illustrative of one example of the invention.

Figure 4:
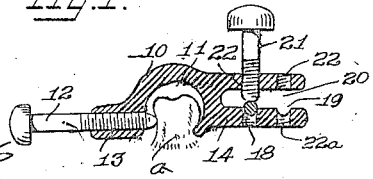
Figure 4 is a longitudinal vertical section on the line 4—4, Figure 2.

In carrying out my invention in accordance with the illustrated example a frame or body 10 is provided, having a recess 11 to accommodate a tooth as indicated at *a* in Figure 4. Suitable clamp means is provided to secure the body 10 to the tooth at the recess, there being employed for the purpose in the illustrated example of the invention a pair of screws 12 turning in screw holes 13 in an end of the body 10, the screws projecting into the recess 11 to bear against the tooth and thereby gripping the tooth between the said screws and the opposite one of said recess 11.

Figure 1:
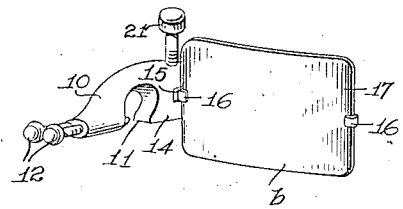
Figure 1 is a perspective view of a holder for a dental X-ray film and constructed in accordance with my invention, the detachable film-supporting element being of a form adapted for use in the taking of X-rays of molars.
Figure 2:
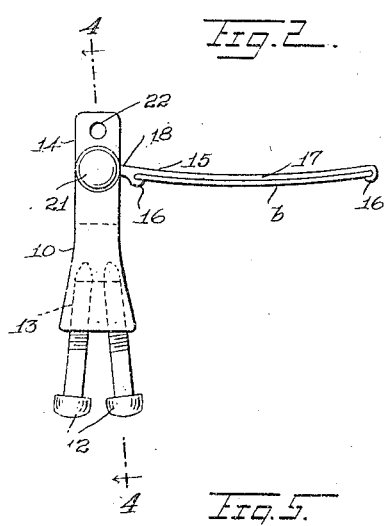
Figure 2 is a plan view of the device shown in Figure 1.
Figure 3:
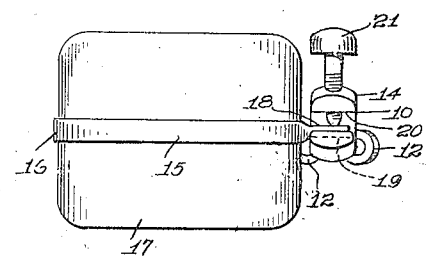
Figure 3 is a rear elevation of the device as arranged in Figures 1 and 2.

A film holder has a shape to conform it to the particular teeth to be subjected to the X-ray and is adapted to be supported on the body 10 for positioning the film. In Figures 1 to 3 the film holder 15 comprises an elongated bracket arm extending laterally from the body 10 and having hook-like members 16 respectively at the outer end and near the inner end which adapt the bracket arm to detachably engage opposite side edges of a backing plate 17 for a film *b*.

Means is provided to detachably hold the bracket arm on the body 10. In Figures 1 to 4, the bracket arm has a shank 18, and a plurality of concave seats 19 is provided in the bottom of a longitudinal slot 20 formed in the body 10 at the end opposite the clamp screw 12. A clamp screw 21 is adapted to enter one of a plurality of screw holes 22 formed in the body 10 in alinement with the seats 19 to clamp the shank 18 seated onto one or the other of said seats. Holes 22ª are preferably formed in the body 10 in alinement with the holes 22 and leading to the seats 19. The forming of the seats 19 at the upper ends of the holes 22ª accurately determines the alined positions of said seats relatively to the screw holes 22.

Figure 5:
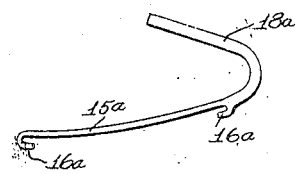
Figure 5 is a plan view of the film-holding element of a form adapted for the taking of X-rays of the bicuspids.

The described bracket arm 15 is adapted to position the holder 17 for the taking of a picture of the molars. A modified bracket is shown in Figure 5 adapted to position the film holder 17 and the film for taking a picture of the bicuspids. In said Figure 5 the shank 18ª of the bracket arm 15ª is returned at the back of said bracket, so that the shank and bracket are in general planes at angles to each other. Said bracket is provided with retaining hooklike members 16ª corresponding with the members 16 to detachably receive the holder or backing plate 17 with a film *b* thereon.

Figure 6:
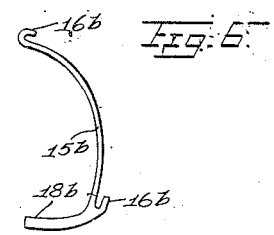
Figure 6 is a view similar to Figure 5 but showing a film-holding element of a form adapted to the incisors.

In Figure 6 the bracket 15ᵇ and its shank 18ᵇ are relatively so formed as to dispose said bracket for positioning the holder 17 for the taking of a picture of the incisors.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:—

1. A device of the class described having tooth-engaging supporting means adapted to be clamped to a tooth and having film-holding means positioned relatively to the supporting means for disposing the film in photographing relation to the teeth to be pictured.

2. A device of the class described adapted to have a support adapted to be clamped to a tooth to hold the device in position, and a film holder projecting laterally therefrom to position the film adjacent to the teeth to be photographed.

3. A device of the class described, having means to positively secure it in position on the teeth in the mouth, and having means to detachably secure a film holder for photographing the teeth.

4. A device of the class described having clamp means to secure the device to a tooth, film-holding means, and means to detachably secure the film-holding means transversely disposed for the photographing of teeth adjacent to the holding tooth.

5. A device of the class described having clamping means to secure it in position to the teeth in the mouth, a detachable film holder thereon, and means to secure said holder in position extending at either side of the device.

6. A device of the class described having tooth-engaging means to secure the device to a tooth, a seat on said device accessible from either side of the device, and a film holder having a shank adapted to be entered onto said seat at either side of the device, and means to hold the shank on the seat.

7. A device of the class described having a tooth-engaging clamp at its outer end to securely clamp the device on the teeth, a transversely disposed seat remote from said clamp, a laterally disposed film holder having a member accommodated on said seat, and means to detachably fasten said member in position.

8. In a film holding device, a film holder, and means for clamping the film holder to a tooth.

LEE ANDREW J. HAWKINS.